United States Patent [19]

Kageorge

[11] Patent Number: 4,687,159
[45] Date of Patent: Aug. 18, 1987

[54] PNEUMATIC DEICERS WITH INEXTENSIBLE THREADS

[75] Inventor: Pedro W. Kageorge, Cuyahoga Falls, Ohio

[73] Assignee: The B. F. Goodrich Company, New York, N.Y.

[21] Appl. No.: 704,369

[22] Filed: Feb. 22, 1985

[51] Int. Cl.⁴ .............................................. B64D 15/18
[52] U.S. Cl. ................................................ 244/134 A
[58] Field of Search ............ 244/134 R, 134 A, 134 B

[56] References Cited

U.S. PATENT DOCUMENTS

| 3,370,814 | 2/1968 | Kageorge et al. | 244/134 A |
| 3,690,601 | 9/1972 | Roemke | 244/134 A |
| 4,463,919 | 8/1984 | Bac | 244/134 A |
| 4,494,715 | 1/1985 | Weisend | 244/134 A |

FOREIGN PATENT DOCUMENTS

| 523880 | 7/1940 | United Kingdom | 244/134 A |
| 542878 | 1/1942 | United Kingdom | 244/134 A |
| 548138 | 9/1942 | United Kingdom | 244/134 A |

Primary Examiner—Galen Barefoot
Attorney, Agent, or Firm—Woodrow W. Ban

[57] ABSTRACT

A pneumatic deicer having a deformable sheet formed of a woven cloth substrate and a fluid-impervious, resilient coating. Inextensible threads are woven into the fabric in a spaced parallel array to define fluid passages therebetween. The passages may be coupled with a source of fluid such as air so that the deicer may be cyclically expanded and contracted to break up ice accumulations on the deicer. A cover ply is secured to the outer face of the deformable layer to expand and contract therewith and to add wear resistance to the deicer. The periphery of the inner face of the deformable sheet may be secured to the leading edge of the aircraft wing through an inner or base ply or, in the alternative, it may be secured directly thereto without the inclusion of the inner or base ply.

8 Claims, 7 Drawing Figures

PNEUMATIC DEICERS WITH INEXTENSIBLE THREADS

BACKGROUND OF THE INVENTION

This invention relates generally to pnuematic deicers of the type having a deformable sheet secured with respect to the leading edge of an aircraft wing, the deicer also having spaced, parallel, inextensible threads to define a series of inflatable sections in the deicer and which may be alternately expanded and contracted by fluid pressure to break up ice accumulations which undesirably tend to form on the surface of the deicer when the aircraft is operating in severe climatic conditions.

During flight, aircraft are periodically exposed to conditions of precipitation and low temperatures which may cause the formation of ice on the leading edges of their wings, the airfoils. During such conditions, it is imperative that this ice be removed if the aircraft is to perform safely. To this end, various types of structures have been designed and utilized to break up and remove such ice in order to insure the safe performance of aircraft. However, icing conditions normally constitute only a relatively small portion of the total flight time for most aircraft. During ice-free periods, when the deicing equipment is not in operation, it is important to maintain the exterior surfaces of the deicers smooth because these surfaces must serve as the airfoils in providing for the safe flight of the aircraft. Any irregularity on these surfaces can seriously hinder the safe performance of the aircraft by creating dangerous air turbulance. Further, excessive bulk and weight of the deicer would increase the cost of materials unnecessarily, the manufacturing cost and also the weight of the aircraft, resulting in unnecessary fuel consumption.

Prior to the present invention, various efforts have been made in the design and manufacture of pneumatic deicing equipment with varing degrees of commercial success and reliability. One of the earlier attempts to solve the problem of deicing is described in U.S. Pat. No. 2,168,328 to Diehl. The Diehl disclosure is particularly concerned with more positively holding the deicer sheet against the leading edge of the aircraft to avoid its flapping. The disclosure is directed to equalizing the pressure on the under surface of the deicer with the pressure on its outer surface. To that end, the Diehl deicer utilized a resilient, elastomeric member molded in a complex design requiring sophisticated fabrication techniques at obviously excessive costs in terms of materials, molds and the like and requiring highly skilled technicians.

Eventually, pnuematic deicers turned to the use of a plurality of layers of sheet material to effect the desired ice removing function. Examples of these designs are found in U.S. Pat. No. 2,440,533 to Antonson and U.S. Pat. No. 2,957,662 to Hess. According to those disclosures, air chambers were formed in the airfoil by a large number of layers of elastomeric sheets, sewn or otherwise joined, in intricate patterns which of necessity undesirably increased the amount of materials, weight, manufacturing time and cost. Although such designs overcame the need for molded parts, they did include the use of materials with complex cross-sectional configurations, probably extruded, which still precluded the utilization of more standardized sheeting material with rectangular cross-sections.

A yet further improvement over the above-mentioned prior art approaches to a more economical and reliable solution to the deicing problem is described in U.S. Pat. No. 3,604,666 to Achberger. According to that disclosure, separate tubes of resilient, elastomeric material were spaced in a parallel array between interior and exterior sheeting members. Although reliable performance resulted, and molding and extrusion were eliminated, the separate tubes had to be individually attached to the adjacent layers in a precise orientation. This required a high degree of craftsmanship for accurate fabrication along with the high cost and unnecessary weight which resulted from the use of the excess materials of the separate tubes.

Perhaps the most desirable pnuematic deicers in the prior art are described in U.S. Pat. No. 3,370,814 to Kageorge, et al. and in U.S. Pat. No. 3,690,601 to Roemke. According to those disclosures, simple elastomeric sheeting material with rectangular cross-sectional configurations was employed without the utilization of excess material to constitute the passages which functioned as the prior art pnuematic tubes. No intricate extrusion or molding of the deicer material was needed, and the amount of material in terms of cost, weight and manufacturing precision was minimized when compared with the prior art available as of that time. The deicer passages were formed by stitching together superposed layers of resilient, elastomeric sheeting. The stitches corresponded to the edges of the passages for constraining the movement of fluid which effected the predetermined expansion and contraction of the deicer to break and remove the ice on the airfoil and thereby maintain the aircraft in a safe mode of operation.

The present invention is directed to pnuematic deicers which overcome the problems of the prior art. They are constructed with discrete passages for air or other fluid whereby the passages may be rapidly and reliably inflated and deflated to expand and contract the deicer for the removal of ice formations from the leading edge of aircraft wings. These deicers are constructed from a minimum amount of resilient, elastomeric sheeting material and with rectangular cross-sectional configurations for reduced cost and weight. They can be assembled without the employment of highly skilled technicians. Further, increased efficiencies are realized by aircraft on which they are employed because of their reduced weight as well as their smooth conformance to the preferred airfoil shape when such deicers are not in operation.

The foregoing has outlined some of the pertinent objects and advantages of the present invention. These objects and advantages should be construed to be merely illustrative of some of the more prominent features and applications of the intended invention. Many other beneficial results can be obtained by applying the disclosed invention in a different manner or modifying the invention within the scope of the disclosure. Accordingly, other objects and advantages as well as a fuller understanding of the invention may be had by referring to the summary of the invention and the detailed description describing the preferred embodiments in addition to the scope of the invention defined by the claims taken in conjunction with the accompanying drawings.

SUMMARY OF THE INVENTION

The present invention is defined by the appended claims with the specific embodiments shown in the attached drawings. For the purpose of summarizing the invention, the invention may be incorporated into a device such as a pnuematic deicer adapted to be secured with respect to the leading edge of an aircraft wing.

The deicer is comprised of a deformable sheet formed of a cloth substrate with a coating of fluid-impervious, reilient material with inextensible threads incorporated into the cloth substrate in a spaced parallel array. The threads act to minimize the deformability of the sheet in those regions of the sheet corresponding to the threads but to permit those regions between the threads, the fluid passages, to be deformed.

Means are provided to couple a source of fluid such as air to adjacent the inner face of the deformable sheet remote from the coating whereby when fluid is cyclically introduced to, and evacuated from, adjacent the inner face of the deformable sheet the deicer will expand and contract to break up and remove ice accumulations from the deicer.

A cover ply is secured to the coated side of the deformable sheet. The cover sheet is formed of a resilient material to expand and contract with the deformable sheet and to increase the wear and weather resistance of the deicer and to add an aesthetic appearance. Neoprene has been found to be a preferred material for these purposes.

For some applications it has been found desirable to also utilize a base ply between the leading edge of the aircraft wing and the deformable sheet. Such a base ply would have its entire inner side secured to the aircraft wing, but only the periphery of its outer side would be secured to the deformable sheet in order to allow the expansion and contraction of the center portion of the deicer. The base is preferably formed of any fluid impervious elastomer, plastic or rubber, to insure that the fluid for inflating and deflating the deicer will not leak out from the passages through the wing.

The foregoing has outlined rather broadly the more pertinent and important features of the present invention in order that the detailed description of the invention that follows may be better understood so that the present contribution to the art can be more fully appreciated. Additional features of the invention will be described hereinafter which form the subject of the claims of the invention. It should be appreciated by those skilled in the art that the conception and the specific embodiments disclosed may be readily utilized as a basis for modifying or designing other structures for carrying out the same purposes of the present invention. It should be also realized by those skilled in the art that such equivalent constructions do not depart from the spirit and scope of the invention as set forth in the appended claims.

BRIEF DESCRIPTION OF THE DRAWINGS

For a fuller understanding of the nature and objects and advantages of the invention, reference should be had to the following detailed description taken in connection with the accompanying drawings in which.

Similar reference numerals refer to similar parts throughout the several views of the drawings.

DETAILED DESCRIPTION

Figure 1:
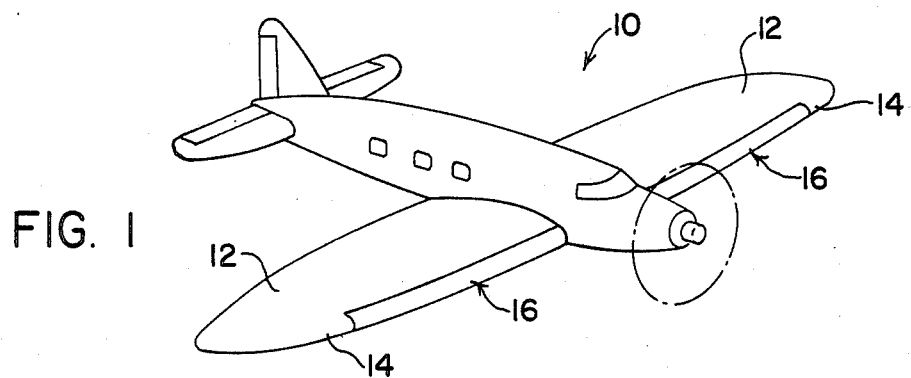
FIG. 1 is a perspective view of a pnuematic deicer constructed in accordance with the principles of the present invention and secured to the leading edge of an aircraft wing.
Figure 2:
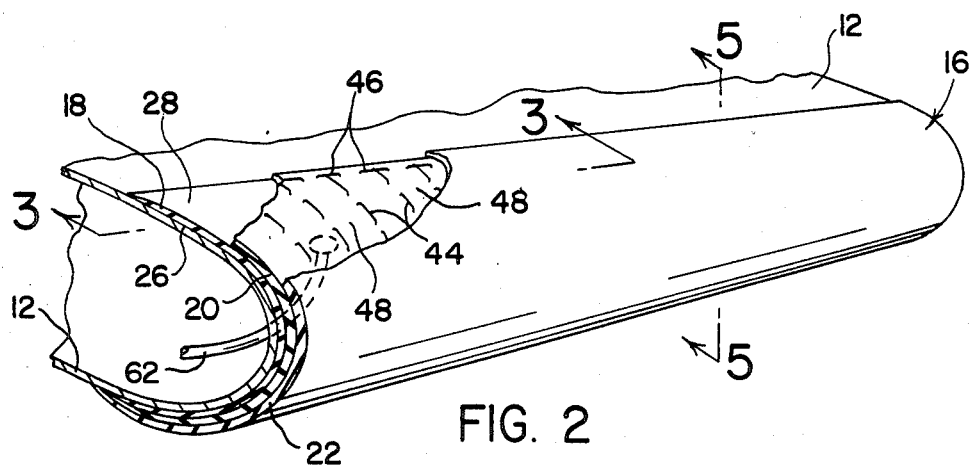
FIG. 2 is an enlarged perspective view of the pnuematic deicer as shown in FIG. 1 with parts broken away to show internal constructions thereof.

Shown in the drawings at FIG. 1 is an aircraft 10 having wings 12, the leading edges 14 of which constitute its airfoils. Each of the airfoils is provided with a pnuematic deicer 16 constructed in accordance with the principles of the present invention. One of these leading edges is shown in an enlarged perspective view in FIG. 2. This view shows the leading edge portion of the wing with its pnuematic deicer operatively secured thereto. The pnuematic deicer is shown with portions of its layers removed to illustrate the salient internal constructions.

The pnuematic deicer is preferably formed of three layers, each of an essentially constant, rectangular cross-sectional configuration. These layers include the inner or base ply 18, the deformable sheet 20, and the exterior or cover ply 22. The inner or base ply is positioned inwardly of the other two layers 20 and 22 and the outer or cover ply 22 is positioned outwardly of the other two layers 18 and 20. As used herein, the terms inner and inwardly are intended to mean in the direction toward the wing 12 and away from the outer or cover ply 22. The terms outer and outwardly are intended to mean in the direction away from the wing 12 or toward the outer or cover ply 22. These three layers are generally consistent in their cross-sectional configuration and in their shape as they are secured together in a superposed relationship for securement to the leading edge of the aircraft.

The inner or base ply 18 is located adjacent to the leading edge 14 of the aircraft 10 which is to be provided with the deicer 16. It is formed of a sheet of fluid-impervious material such as an elastomer, plastic or rubber, natural or synthetic, or blends thereof. The entire inner face 26 of the base ply 18 is adapted to be secured to the leading edge of the aircraft whereby air or other fluid entrapped outwardly of the outer face 28 of the base ply 18 by the deformable sheet 20 will not permeate or leak inwardly through any seam or other aperture in the aircraft leading edge but will, rather, be retained between the base ply 18 and deformable sheet 20 for the inflation and deflation of the deicer 16.

Next most adjacent the wing and positioned immediately outwardly of the base ply is the deformable sheet 20. The deformable sheet is formed of a stretchable or extensible fabric 32, preferably any known woven material formed of natural or synthetic threads so long as the fabric is capabale of being stretched or extended during the inflation and deflation of the deicer. A resilient, elastomeric material is calendered or otherwise coated to the outer face 34 of the fabric 32 to constitute a coating 36 having inner and outer faces 38 and 40. This coating serves two functions. The first function is to improve the ability of the deformable sheet to retain fluid such as air between it and the base ply during inflation and deflation of the deicer. The second function of the coating is to cause the deformable sheet to return to its position flush with the inner ply and leading edge of the aircraft when the deicer is deflated. This resilient characteristic enhances the operability of the deicer as an airfoil when the deicer is not being utilized and during the intermittent deflation step whenever the deicer is being utilized.

The inner face 38 of the deformable sheet is left in its natural fabric state to preclude the intimate contact between the outer face 28 of the base ply 18 and the inner face 38 of the deformable sheet 20 when the deicer is being deflated. Such intimate contact would preclude the desired flow of fluid from the deicer by the entrapment of such evacuating fluid.

Provided within the deformable sheet are strands of essentially inextensible threads 44 to minimize, reduce or abate the extension of the deformable sheet 20 whenever pressure from an inflating fluid is provided to the inner face of the deformable sheet. These threads are constructed of any known material capable of being formed into threads and which will resist elongation under applied pressure. A preferred material for these threads is stainless steel. Incorporation of these inextensible threads into the fabric of the deformable sheet is preferably done at the mill during the weaving of the fabric.

Conventional stretchable materials, whether natural or synthetic, are utilized as both the fill and the warp of weave of the fabric. However, periodically spaced fill threads of the inextensible material are woven into the fabric. Spaced warp threads 46 of preferably the same inextensible material are also incorporated into the fabric to act as anchoring points around which the ends of the inextensible fill threads may be secured. Retention of the inextensible threads is enhanced by the cementing of the periphery on the inner face of the deformable sheet 20 to the base ply 18 so that the two inextensible warp threads are cemented therebetween.

In order to reduce the extensibility of the deformable sheet in the regions defined by the inextensible threads, such inextensible threads are not woven into and out of each warp thread but pass through the fabric only periodically, as for example every three to five warp threads for a reduced number of thread reversals. Since the extension of the deformable sheet in these regions occurs through the straightening out of the inextensible threads when subjected to fluid pressure at the times of inflation, the reduced number of thread reversals will reduce the ability of the inextensible threads to elongate during inflation of the deicer.

Figure 3:
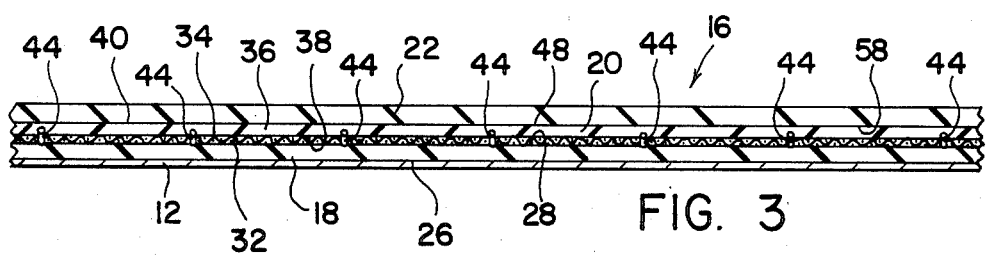
FIG. 3 is a sectional view of the pnuematic deicer shown in FIGS. 1 and 2 and taken along line 3—3 of FIG. 2.
Figure 4:
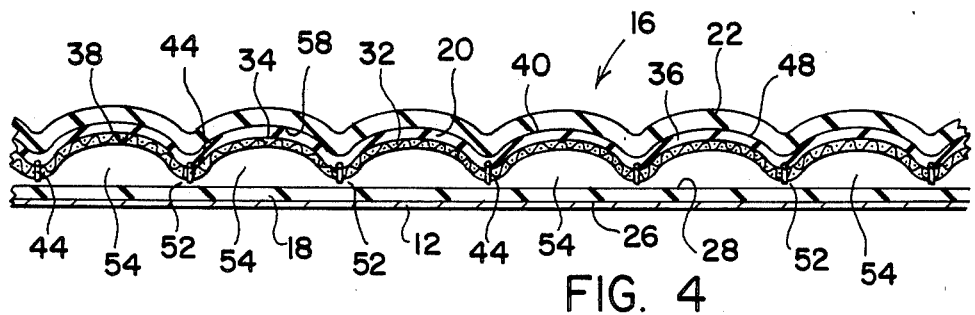
FIG. 4 is a sectional view taken along line 3—3 of FIG. 2 similar to FIG. 3 but showing the pnuematic deicer in an inflated condition.
Figure 5:
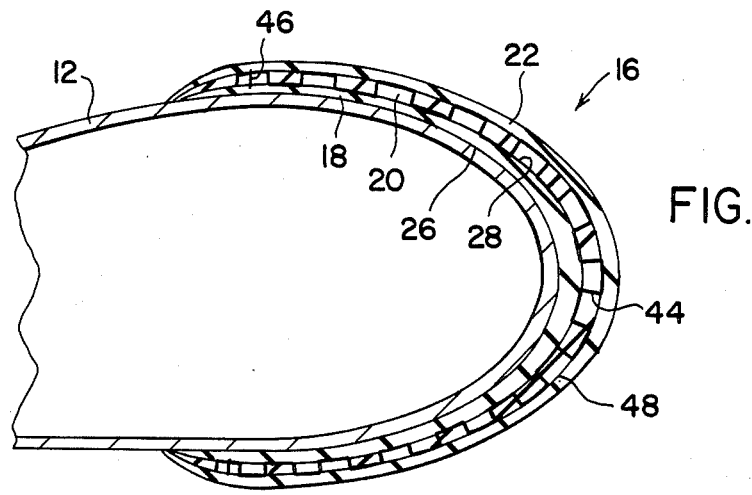
FIG. 5 is a sectional view of the pnuematic deicer shown in FIGS. 1 and 2 and taken along line 5—5 of FIG. 2.
Figure 6:
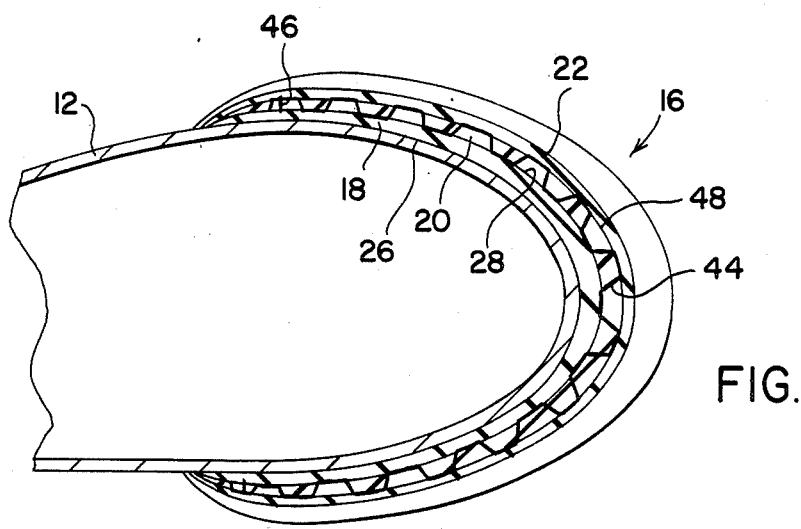
FIG. 6 is a sectional view taken along line 5—5 of FIG. 2 similar to FIG. 5 but showing the pnuematic deicer in an inflated condition.

The inflating pressure from the fluid introduced inwardly of the deformable sheet tends to urge the deformable sheet outwardly, and when the deformable sheet so moves it acts to straighten the bends or "crimp" in the extensible threads and slightly increase its length from end to end to allow the slight outward movement of the deformable sheet in the regions corresponding to these essentially inextensible threads. This orientation and position of the deformable sheet and inextensible threads is shown in FIGS. 4 and 6. Deflation of the deicer will allow the resilient coating and inextensible threads to return to their positions and orientations flat against the leading edge of the aircraft as shown in FIGS. 3 and 5. A negligible degree of extension of the deformable sheet along the lines of these threads will occur during inflation. Such negligible extension of the deformable sheet inwardly of the inextensible threads is not undesirable since it will allow the inflating fluid to flow from one passage 54 to the next adjacent passage when the deformable sheet is inflated in regions 52 between regions 54. The use of separate zones of inflation between non-inflatable zones results in an undulating pattern of expansion and contraction which has been found to be particularly effective in performing the deicing function.

When the inflating fluid is provided to the space between the deformable sheet and the base ply it will effectively form passages in a parallel array similar to those previously attainable only with separate discrete tubes or sewn zones as described in other prior art structures but without the added manufacturing steps of sewing plural sheets or separate tubes together.

The drawings illustrate the passages for the inflating fluid as extending cordwise on the aircraft wing. It should be understood that the passageways could be perpendicular thereto extending from the fuselage of the aircraft toward the wingtip rather than the direction of aircraft motion. The selection of the orientation of the passages is largely dependent upon the nature of the aircraft with which the pnuematic deicer is to be utilized.

Securement of the various deicer layers together and to the leading edge of the aircraft may be accomplished by any of the known cements or other bonding agents compatible with the materials employed.

The outer or cover ply 22 is of the same size and shape as the deformable sheet 20 and base ply 18. It could also be slightly larger in order to insure the total covering of the two layers inwardly thereof. The cover layer is cemented over the entire inner face 58 to the outer face 48 of the deformable sheet 20 for concurrent expansion and contraction therewith. It is preferably formed of a resilient, extensible material to expand and contract with the deformable sheet. It is also of a material selected to extend the weather resistant properties of the deicer. It is also selected to provide a more aesthetically pleasing appearance. A preferred material for such varied purposes is Neoprene.

A communication means 62 is provided to couple the inflatable passages 54 of the deicer 16 with a source of fluid such as air or other fluid to introduce or evacuate the fluid from the passages during inflation and deflation of the deicer in a continuous cycle of operation, in a manner as is well known in the art.

It is this cycling, including the expansion and contraction of the passages and the inflation and deflation of the deicer, which will break up any ice formation on the airfoil of the aircraft with the normal motion of the aircraft forcing the ice therefrom.

Figure 7:
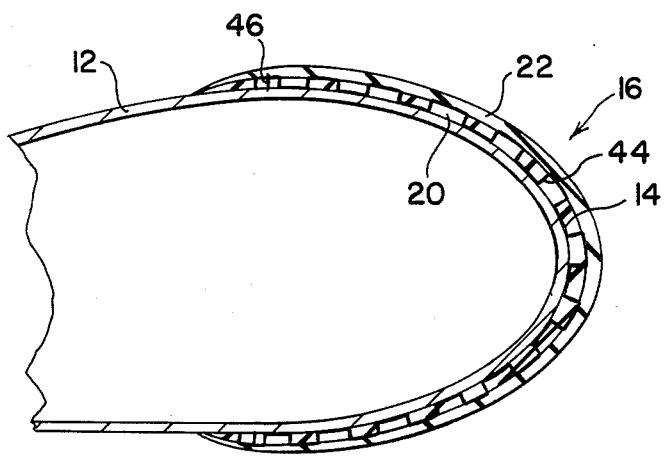
FIG. 7 is a sectional view of an alternate embodiment of a pnuematic deicer of the present invention shown secured to the leading edge of an aircraft wing, similar to the showing of FIG. 5, but with the inner or base ply eliminated.

An alternate embodiment of the present invention is shown in FIG. 7. In that embodiment, the base ply 18 is eliminated. Such ply is normally necessary for proper operation when the leading edge of the aircraft is formed of metal which may have apertures, imperfect seams, spaces adjacent rivets, or the like, as frequently occurs during construction and which may act as a conduit for allowing the escape of fluid from the passages of the deicer and thus hinder its effective operation. Many of the newer aircraft, however, have wings formed of molded reinforced plastics or other composite materials or may be provided with their own sealer coating which are totally impervious to the flow of fluid therethrough. For such applications, the periphery of the deformable sheet may be bonded directly to the leading edge of the aircraft and the flow of fluid to the passage 54 between the deformable sheet 20 and the leading edge 14 of the aircraft wing 12 is as effective and as fluid impervious as is the primary embodiment wherein the inner or base ply 18 is utilized.

It should be understood that the term wing as used in this application is meant to encompass a rotary wing such as the blade of a helicopter, a non-fixed wing aircraft, just as it is meant to encompass the fixed wing of an aircraft of the type shown in FIG. 1. The leading edge of a helicopter blade is, in fact, an airfoil subject to much the same type of icing and other problems as a fixed wing aircraft and employing deicers to overcome those same types of problems, all as discussed above.

The present disclosure includes that contained in the appended claims as well as that of the foregoing description. Although this invention has been described in its preferred forms and embodiments with a certain degree of particularity, it is understood that the present disclosure of the preferred forms and embodiments has been made only by way of example and that numerous changes in the details of construction and the combination and arrangement of parts may be resorted to without departing from the spirit and scope of the invention.

Now that the invention has been described what is claimed is:

1. A pneumatic deicer adapted to be secured with respect to the leading edge of an aircraft wing, said deicer including
    a deformable sheet formed of a cloth substrate with a coating of fluid-impervious, resilient material secured to the outer face of said substrate remote from the aircraft wing; and
    a series of essentially inextensible threads formed essentially only into said cloth in spaced, parallel relationship corresponding to regions of said sheet adapted not to be deformed and with the regions of said deformable sheet between said inextensible threads adapted to be deformed, the inextensible threads do not to attach the deformable sheet to any surface there underlying, other than, at edge portions of the deformable sheet where desired.

2. The pneumatic deicer as set forth in claim 1 and further including means to couple a source of fluid to passages formed by the inner face of the deformable sheet remote from the coating whereby when fluid is cyclically introduced to and evacuated from said passages the deicer will expand and contract to break up and remove ice accumulations from the deicer.

3. The pneumatic deicer as set forth in claim 1 wherein said cloth substrate is woven and inextensible threads are part of the fill of said cloth substrate and further including additional inextensible threads as part of the warp of said cloth substrate positioned to anchor the ends of the inextensible threads of said fill.

4. The pneumatic deicer as set forth in claim 1 and further including a cover ply having its inner face secured to the outer face of said sheet, said cover ply being fabricated of a wear-resistant, deformable material capable of expanding and contracting with said sheet during the operation of the deicer.

5. The pneumatic deicer as set forth in claim 1 and further including a base ply having its inner face adapted to be secured to the leading edge of the aircraft wing and with the periphery of the inner face of said sheet secured to the periphery of the outer face of the base ply, said base ply being fabricated of a fluid-impervious material to preclude the leaking of fluid to interior of the aircraft wing.

6. The pneumatic deicer as set forth in claim 1 wherein the periphery of the inner face of said sheet is adapted to be secured directly to the leading edge of the aircraft wing.

7. A pneumatic deicer adapted to be secured with respect to the leading edge of an aircraft wing, said deicer including
    a deformable sheet formed of a cloth substrate with a coating of fluid-impervious, resilient material secured to the outer face of the substrate remote from the aircraft wing;
    a series of essentially inextensible threads formed essentially only into said cloth in spaced, parallel relationship corresponding to regions of said sheet adapted not to be deformed and with the regions of said sheet between the inextensible threads adapted to be deformed.
    a base ply having its inner face adapted to be secured to the leading edge of the aircraft wing and with the periphery of the outer face of said base ply secured to the periphery of the inner face of said sheet, said base ply being fabricated of a fluid-impervious material to preclude the leaking of fluid to interior of the aircraft wing;
    the inextensible threads do not attach the deformable ply to the base ply other than at edge portions of the deformable ply, where desired; and
    a cover ply having its inner face secured to the outer face of said sheet, said cover ply being fabricated to a wear-resistant, deformable material capable of expanding and contracting with said sheet during the operation of the deicer.

8. A pneumatic deicer adapted to be secured to the leading edge of an aircraft wing, said deicer including
    a deformable sheet formed of a cloth substrate with a coating of fluid-impervious, resilient material secured to the outer face of the substrate remote from the aircraft wing, the periphery of said sheet being adapted to be directly secured to the leading edge of an aircraft wing;
    a series of parallel, essentially inextensible threads formed essentially only into the cloth in spaced, parallel relationship corresponding to regions of said sheet adapted not to be deformed and with the regions of said sheet between the inextensible threads adapted to be deformed the inextensible threads do not attach the deformable ply to the wing other than at edge portions of the deformable ply, where desired; and
    a cover ply having its inner face secured to the outer face of said sheet, said cover ply being fabricated of a wear-resistant, deformable material capable of expanding and contracting with said sheet during the operation of the deicer.

* * * * *